(12) United States Patent
Sung

(10) Patent No.: US 10,723,357 B2
(45) Date of Patent: Jul. 28, 2020

(54) TRACTION CONTROL SYSTEM AND CONTROL METHOD THEREOF

(71) Applicant: MANDO CORPORATION, Pyeongtaek-si, Gyeonggi-do (KR)

(72) Inventor: Seung-Yong Sung, Ansan-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 117 days.

(21) Appl. No.: 15/825,280

(22) Filed: Nov. 29, 2017

(65) Prior Publication Data
US 2018/0148062 A1    May 31, 2018

(30) Foreign Application Priority Data

Nov. 29, 2016 (KR) .................. 10-2016-0160716

(51) Int. Cl.
| | | |
|---|---|---|
| *B60W 30/18* | (2012.01) | |
| *B60W 30/188* | (2012.01) | |
| *B60W 40/068* | (2012.01) | |
| *B60W 30/02* | (2012.01) | |

(52) U.S. Cl.
CPC ...... *B60W 30/18172* (2013.01); *B60W 30/02* (2013.01); *B60W 30/188* (2013.01); *B60W 40/068* (2013.01); *B60W 2520/105* (2013.01); *B60W 2710/0666* (2013.01)

(58) Field of Classification Search
CPC ........... B60W 30/02; B60W 30/18172; B60W 30/188; B60W 40/068; B60W 2520/105; B60W 2710/0666
See application file for complete search history.

(56) References Cited

U.S. PATENT DOCUMENTS

| | | | | |
|---|---|---|---|---|
| 5,758,014 A | * | 5/1998 | Young ................. | B60L 3/10 388/815 |
| 6,141,618 A | * | 10/2000 | Yamashita ........... | B60K 28/16 180/197 |
| 9,802,616 B2 | * | 10/2017 | Horst ................... | B60W 30/188 |

(Continued)

FOREIGN PATENT DOCUMENTS

| | | |
|---|---|---|
| KR | 10-2007-0065946 A | 6/2007 |
| KR | 10-2007-0105128 A | 10/2007 |
| WO | 2016092602 A1 | 6/2016 |

OTHER PUBLICATIONS

Chinese Office Action dated Apr. 8, 2020, in connection with the Chinese Patent Application No. 201711226519.1 citing the above reference(s).

*Primary Examiner* — Anshul Sood
(74) *Attorney, Agent, or Firm* — Hauptman Ham, LLP

(57) ABSTRACT

Disclosed herein are a traction control system and a control method thereof. The traction control system includes a communicator configured to receive acceleration of a vehicle; and a controller configured to decrease output torque in response to a decrease of the received vehicle acceleration, wherein the controller outputs second torque smaller than first torque corresponding to the decreased vehicle acceleration and then increases the second torque to the first torque during a predetermined first threshold time when the controller determines that the vehicle is traveling on a low-friction road surface into which a high-friction road surface changed on the basis of the vehicle acceleration.

11 Claims, 6 Drawing Sheets

(56) References Cited

U.S. PATENT DOCUMENTS

| | | | |
|---|---|---|---|
| 2010/0057284 A1* | 3/2010 | Tang | B60L 3/106 |
| | | | 701/22 |
| 2011/0106458 A1* | 5/2011 | Shiozawa | B60T 8/172 |
| | | | 702/41 |
| 2012/0226399 A1* | 9/2012 | Bergfjord | B60L 15/20 |
| | | | 701/22 |
| 2015/0239475 A1* | 8/2015 | Bayar | B60K 6/365 |
| | | | 701/22 |

* cited by examiner

TRACTION CONTROL SYSTEM AND CONTROL METHOD THEREOF

CROSS-REFERENCE TO RELATED APPLICATION

This application claims the benefit of Korean Patent Application No. 10-2016-0160716, filed on Nov. 29, 2016 in the Korean Intellectual Property Office, the disclosure of which is incorporated herein by reference.

BACKGROUND

1. Field

Embodiments of the present disclosure relate to a vehicular traction control system and a control method thereof, and more particularly, to a vehicular traction control method for assisting in driving a vehicle from a high-friction road surface to a low-friction road surface.

2. Description of the Related Art

Generally, an electronic control system of a vehicle is used to efficiently prevent the vehicle from spinning and to obtain a strong and stable braking force. Examples of the electronic control system include an anti-lock brake system (hereinafter also referred to as an ABS) that prevents wheel slip when the vehicle is braked, a traction control system (hereinafter also referred to as a TCS) that controls engine torque to prevent excessive wheel spin when the vehicle is suddenly started or accelerated, and the like.

A TCS generally uses a target torque value that linearly increases according to a gear ratio and vehicle acceleration to calculate a target torque value for controlling engine torque.

However, the target torque value may not be appropriate for a road surface on which a vehicle is running because the TCS cannot quickly apply appropriate optimal torque in response to a change in road surface.

For example, a vehicle's acceleration capability for moving forward or upward by means of acceleration of a high-friction (High-p) driven wheel may increase by a target torque value of a low-friction (Low-p) driven wheel being controlled when the vehicle oscillates on a road surface having a friction coefficient difference between right and left wheels of the vehicle. However, when the target torque value of the low-friction driven wheel is excessively lowered, torque of the low-friction driven wheel is delivered to the high-friction driven wheel with respect to the same shaft, and thus the high-friction driven wheel can spin. Accordingly, a control pattern may not be constant when the vehicle travels on a low-friction road surface.

In addition, it is assumed that a vehicle travels from a high-friction road surface to a low-friction road surface during TCS engine control. In this case, the vehicle enters the low-friction road surface while high torque is delivered to each wheel to obtain the maximum acceleration during high friction, and thus the vehicle spins greatly.

This can reduce stability and acceleration of the vehicle and cause damage to the vehicle due to an excessive engine speed.

SUMMARY

Therefore, it is an aspect of the present disclosure to minimize vehicle spin that may occur when a vehicle is traveling from a high-friction (High-p) road surface to a low-friction (Low-p) road surface during TCS engine control.

Additional aspects of the disclosure will be set forth in part in the description which follows and, in part, will be obvious from the description, or may be learned by practice of the disclosure.

In accordance with one aspect of the present disclosure, a traction control system includes a communicator configured to receive acceleration of a vehicle; and a controller configured to decrease output torque in response to a decrease of the received vehicle acceleration, wherein the controller outputs second torque smaller than first torque corresponding to the decreased vehicle acceleration and then increases the second torque to the first torque during a predetermined first threshold time when the controller determines that the vehicle is traveling on a low-friction road surface into which a high-friction road surface changed on the basis of the vehicle acceleration.

The controller may determine that the vehicle is traveling on the road that changes from the high-friction road surface to the low-friction road surface when the vehicle acceleration decreases to a level lower than predetermined second acceleration within a predetermined third threshold time after the vehicle acceleration is maintained at a level higher than predetermined first acceleration for a predetermined second threshold time.

The second torque may be calculated by a proportional-integral (PI) control method.

In accordance with another aspect of the present disclosure, a control method of a traction control system includes receiving acceleration of a vehicle; decreasing output torque in response to a decrease of the received vehicle acceleration; and outputting second torque smaller than first torque corresponding to the decreased vehicle acceleration and then increasing the second torque to the first torque during a predetermined first threshold time when it is determined that the vehicle is traveling on a low-friction road surface into which a high-friction road surface changed on the basis of the vehicle acceleration.

The determination that the vehicle is traveling on the road that changes from the high-friction road surface to the low-friction road surface on the basis of the vehicle acceleration may further include determining that the vehicle is traveling on the road that changes from the high-friction road surface to the low-friction road surface when the acceleration decreases to less than predetermined second acceleration within a predetermined third threshold time after the acceleration is maintained at a level higher than predetermined first acceleration for a predetermined second threshold time.

The second torque may be calculated by a PI control method.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
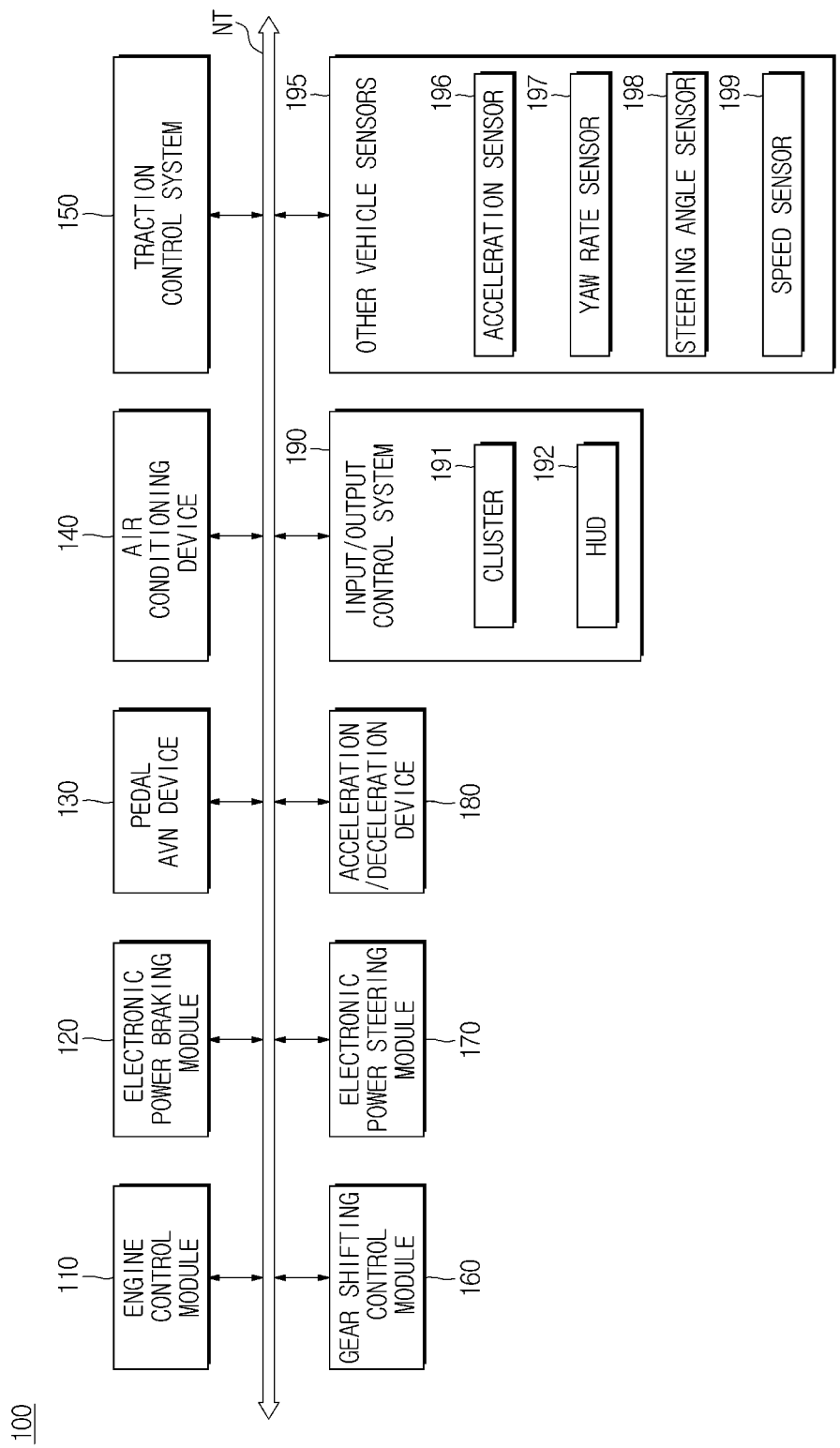
FIG. 1 is a block diagram showing various kinds of electronic devices included in a vehicle including a traction control system according to an embodiment of the present disclosure.

Hereinafter, embodiments of the present disclosure will be described in detail with reference to the accompanying drawings. The following embodiments are provided to fully convey the spirit of the disclosure to those skilled in the art. However, the present disclosure may be embodied in different forms and is not to be construed as limited to the embodiments set forth herein. In the drawings, elements that bear no relationship to the description of the present disclosure will be omitted for clarity, and some elements may be exaggerated to facilitate understanding of the present disclosure.

Figure 2:
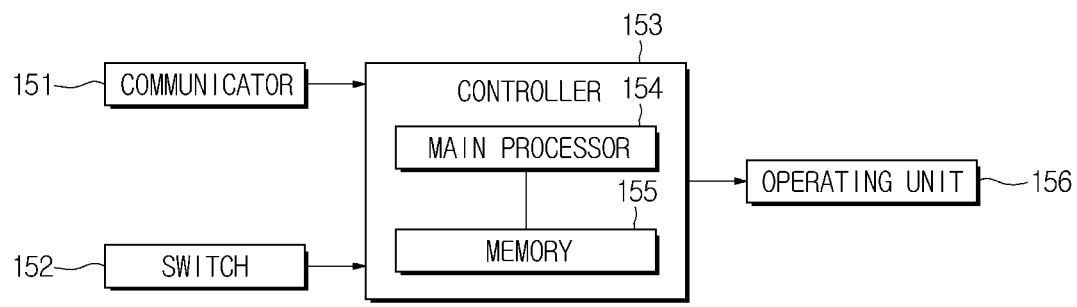
FIG. 2 is a block diagram of a traction control system according to an embodiment of the present disclosure.

FIG. 1 is a block diagram showing various kinds of electronic devices included in a vehicle including a traction control system according to an embodiment of the present disclosure, and FIG. 2 is a block diagram of a traction control system according to an embodiment of the present disclosure.

As shown in FIG. 1, a vehicle 1 may include an engine control module 110, an electronic power braking module 120, an audio/video/navigation (AVN) device 130, an air conditioning device 140, a traction control system 150, a gear shifting control module 160, an electronic power steering module 170, an acceleration/deceleration device 180, an input/output control system 190, and other vehicular sensors 195.

However, the various kinds of electronic devices 100 shown in FIG. 1 are just some electronic devices included in the vehicle 1, and a larger variety of electronic devices may be provided in the vehicle 1.

Also, the various kinds of electronic devices 100 included in the vehicle 1 may communicate over a vehicle communication network NT.

The vehicle communication network NT may employ a communication protocol such as Media Oriented Systems Transport (MOST) with a communication speed of up to 24.5 mega bits per second (Mbps), FlexRay with a communication speed of up to 10 Mbps, Controller Area Network (CAN) with a communication speed of 125 kilo bits per second (kbps) to 1 Mbps, Local Interconnect Network (LIN) with a communication speed of 20 kbps, etc. The vehicle communication network NT may employ not only a single communication protocol such as the MOST, the FlexRay, the CAN, and the LIN but also a plurality of communication protocols.

The engine control module 110 performs fuel injection control, fuel efficiency feedback control, lean-burn control, ignition time control, idle revolutions per minute (rpm) control, and the like.

The electronic power braking module 120 may control a braking device of the vehicle 1 and may include an anti-lock brake system (ABS) as a representative example.

The AVN device 130 is a device that outputs music or a video according to a driver's control command. In detail, according to the driver's control command, the AVN device 130 may play music or a video or display an operation status to the driver through the traction control system 150 according to an embodiment of the present disclosure.

The AVN device 130 may include an AVN display (not shown), and the AVN display may employ a touch sensing display (e.g., a touch screen) capable of receiving a touch input of the driver.

Also, the AVN display may employ a liquid crystal display (LCD) panel, an organic light emitting diode (OLED) panel, or the like.

The air conditioning device 140 may heat or cool indoor air depending on an indoor temperature of the vehicle 1.

Also, the gear shifting control module 160 performs gear shifting point control, damper clutch control, pressure control when a friction clutch is turned on/off, engine torque control during gear shifting, etc. The gear shifting control module 160 may be not only a single device but also a plurality of devices connected to each other through communication.

Also, the electronic power steering module 170 may decrease a steering force during slow traveling or parking, and may assist a user with a steering operation during fast traveling, for example, by increasing the steering force.

Also, the acceleration/deceleration device 180 includes an accelerator pedal and a brake pedal. The acceleration/deceleration device 180 accelerates the vehicle 1 when a pedal effort corresponding to a driver's acceleration intention is applied to the accelerator pedal, and decelerates the vehicle 1 when a pedal effort corresponding to a deceleration intention of the driver is applied to the brake pedal.

In detail, the brake pedal is a foot pedal that is used by the driver to brake the vehicle 1, and may push a piston of a master cylinder to generate hydraulic pressure to decelerate the vehicle 1. A pedal effort for operating the brake pedal with the driver's foot may be measured by a pedal effort sensor (not shown) and used to determine a brake intention of the driver.

Also, the accelerator pedal is a foot pedal that is used by the driver to accelerate the vehicle 1. When the accelerator pedal is pushed, an engine cooperating with a carburetor (not shown) inside the vehicle 1 has a high rotation rate to enable the vehicle 1 to be accelerated. A pedal effort for operating the accelerator pedal with the driver's foot may be measured by a pedal effort sensor (not shown) and used to determine the driver's acceleration intention.

The input/output control system 190 receives a driver's control command through a button and displays information corresponding to the driver's control command. The input/output control system 190 may include a cluster display 191 provided in a dashboard and configured to display an image, and a head up display (HUD) 192 configured to project an image onto a windshield.

The cluster display 191 is provided in the dashboard and configured to display an image. In particular, the cluster display 191 is provided adjacent to the windshield to enable the driver to acquire operational information, road information, a driving route, or the like while a gaze of the driver is not significantly deviated from a forward direction of the vehicle 1.

The HUD 192 may project an image onto the windshield. In detail, the image projected onto the windshield by the HUD 192 may include operational information of the vehicle 1, road information, a driving route, or the like, and the HUD 192 may provide guidance or notification of location information to a user on the basis of information received from a navigation system.

In addition, although not shown, a power transfer control module (not shown) performs gear shifting point control, damper clutch control, pressure control upon turning on/off of a friction clutch, engine torque control during gear shifting, etc.

The other vehicle sensors 195 are included in the vehicle 1 and configured to detect driving information of the vehicle 1, and may include an acceleration sensor 196, a yaw-rate sensor 197, a steering angle sensor 198, a speed sensor 199, etc.

The acceleration sensor 196 measures acceleration of the vehicle 1, and may include a lateral acceleration sensor (not shown) and a longitudinal acceleration sensor (not shown).

Assuming that a moving direction of the vehicle is an X axis and that a lateral direction is a direction perpendicular to the moving direction (a Y axis), the lateral acceleration sensor measures acceleration in the lateral direction.

The longitudinal acceleration sensor may measure acceleration in an X axis direction, i.e., in the moving direction of the vehicle 1.

The acceleration sensor 196, which is a device that detects a change in speed per unit time, detects a dynamic force such as acceleration, vibration, and an impact, and performs measurement using principles of inertia force, electric deformation, and gyro.

The yaw-rate sensor 197 may be installed at each wheel of the vehicle 1 and configured to detect a yaw rate value of the vehicle 1 in real time.

The yaw-rate sensor 197 has a cesium crystal device therein. The yaw-rate sensor 197 rotates as the vehicle 1 moves. At this point, the cesium crystal device itself rotates to generate a voltage. The yaw-rate sensor 197 may detect a yaw rate of the vehicle 1 on the basis of the generated voltage.

The steering angle sensor 198 measures a steering angle. The steering angle sensor 198 may be installed on the bottom of a steering wheel (not shown) and configured to detect a steering speed, a steering direction, and a steering angel of the steering wheel.

The speed sensor 199 may be installed inside each of wheels FL, FR, RL, and RR of the vehicle 1 and configured to detect a rotational speed of the wheel and transmit the measured rotational speed to the traction control system 150 through the network NT.

Last, the traction control system 150 according to an embodiment of the present disclosure performs traction control for detecting a state of the vehicle 1 acquired through the vehicle sensors 195 included in the vehicle 1 and preventing wheel spin. Particularly, the traction control system 150 checks road surface friction and then appropriately controls a torque value of the traction control.

The elements of the vehicle 1 have been described above.

Elements and operations of the traction control system 150 included in the vehicle 1 will be described below.

As shown in FIG. 2, the traction control system 150 according to an embodiment of the present disclosure includes a communicator 151, a switch 152, a controller 153, and an operating unit 156.

First, the communicator 151 receives control signals from the various kinds of electronic devices 100 included in the vehicle 1 over the vehicle communication network NT shown in FIG. 1 and transmits a control signal generated by the traction control system 150 to the various kinds of electronic devices 100.

For example, the traction control system 150 receives a speed of each of the wheels detected by the speed sensor 199 and acceleration of the vehicle 1 measured by the acceleration sensor 196 through the communicator 151.

In addition, the traction control system 150 may determine whether wheel spin occurs on the basis of the received sensor values, and may transmit a traction control signal corresponding to the determination to the various kinds of electronic devices 100 through the communicator 151.

Next, although not shown, the switch 152 acquires an input regarding "on" and "off" operations of the traction control system 150 from a user. Thus, when the user selects the "on" operation, the traction control system may operate to prevent wheel spin.

The controller 153 collectively controls the traction control system 150. In detail, the controller 153 includes a main processor 154 configured to determine wheel spin and road surface friction based on the sensor values of the various kinds of sensors included in the vehicle, which are acquired from the communicator 151, and calculate a torque value, and a memory 155 configured to store various kinds of data.

First, the main processor 154 collectively controls the traction control system 150 on the basis of sensor values received from the communicator 151.

The main processor 154 determines whether the vehicle is traveling from a high-friction road surface to a low-friction road surface. To this end, the main processor 154 may perform the determination on the basis of the vehicle acceleration and the wheel speed received through the communicator 151.

In detail, in order to determine whether the vehicle 1 is traveling on a low-friction road surface into which a high-friction road surface changed, the main processor 154 determines whether the vehicle 1 is traveling on a high-friction road surface and then determines whether the vehicle 1 will move to a low-friction road surface within a certain time period when it is determined that the vehicle 1 is traveling on a high-friction road surface.

In this case, in order to determine whether the vehicle 1 is traveling on a high-friction road surface, the main processor 154 detects an acceleration value of the vehicle 1 acquired through the acceleration sensor 196 included in the vehicle sensors 195 or the speed sensor 199 installed in a non-driven wheel.

In this case, when the acquired acceleration exceeds a predetermined first acceleration threshold for a predetermined first threshold time, the main processor 154 determines that the vehicle is traveling on a high-friction road surface. However, in order to determine whether the acquired acceleration of the vehicle 1 exceeds or maintains the predetermined first acceleration threshold for the predetermined first threshold time, the main processor 154 may remove a disturbance occurring while the vehicle 1 is traveling by means of hysteresis or a filter to remove noise that may be generated during traveling.

Figure 3:
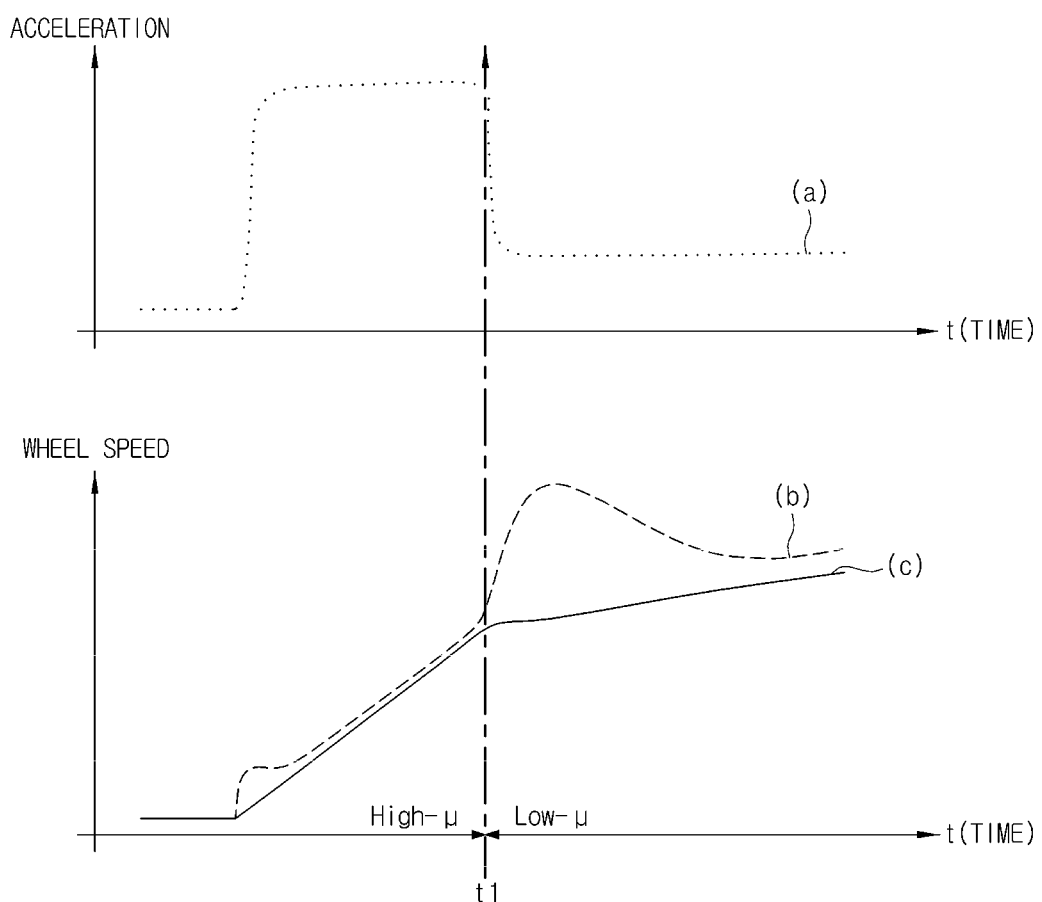
FIG. 3 is a graph showing a change in road surface, a vehicle speed, wheel spin, and lateral acceleration over time during traction control according to an embodiment of the present disclosure.

For example, FIG. 3 is a graph showing a change in road surface, a vehicle speed, wheel spin, and lateral acceleration over time during traction control according to an embodiment of the present disclosure.

(a) in FIG. 3 is a graph showing vehicle acceleration, (b) in FIG. 3 is a graph showing wheel spin of a driven wheel, and (c) in FIG. 3 is a graph showing vehicle speed.

In this case, when the vehicle 1 is traveling from a high-friction road surface to a low-friction road surface at Reference Time t1 (Reference Time t1 is shown in the graph of FIG. 3, but a period such as the predetermined first threshold time may be set as Reference Time t1), it may be determined that wheel spin occurs in the driven wheel at Reference Time t1.

Accordingly, the main processor 154 adjusts engine torque to minimize the wheel spin of the driven wheel.

According, after it is determined that the vehicle is traveling on a high-friction road surface, the acceleration of the vehicle 1 may be decreased to a predetermined second acceleration threshold or less within a predetermined second threshold time. In this case, the main processor 154 determines that the vehicle 1 is traveling on a low-friction road surface into which a high-friction road surface changed.

In particular, when it is determined that the road changes from a high-friction road surface to a low-friction road surface, wheel spin may significantly occur in the driven wheel. Thus, the main processor 154 decreases engine torque in order to quickly prevent the occurrence of wheel spin.

In detail, the main processor 154 uses a proportional-integral (PI) control method for calculating an amount by which the engine torque is decreased. This refers to PI control, and the engine torque may be quickly decreased through proportional control (P control).

In particular, $K_P$, which is used during P control, refers to a gain value or a gain, and Final $K_P$ is calculated by multiplying Reference $K_P$ by a factor corresponding to a change of the road surface. In detail, Final $K_P$ to be calculated by the main processor 154 may be described using the following Equation 1:

$$\text{Final } K_P = \text{Reference } K_P * P_{factor} \qquad \text{<Equation 1>}$$

where Final $K_P$ indicates a final gain value to be applied during P control, Reference $K_P$ indicates a reference gain value during P control, and $P_{factor}$ indicates a calibration parameter corresponding to the maximum time for increasing a gain value when a road changes from a high-friction road surface to a low-friction road surface.

That is, the maximum value is assigned to $P_{factor}$ so that the maximum value can be assigned to the gain value at a time at which the road surface changes (0 sec). As time passes, 100% is assigned to $P_{factor}$ at a final time by decreasing the gain value. Accordingly, a reference value P may be calculated as a final P control value.

Figure 4:
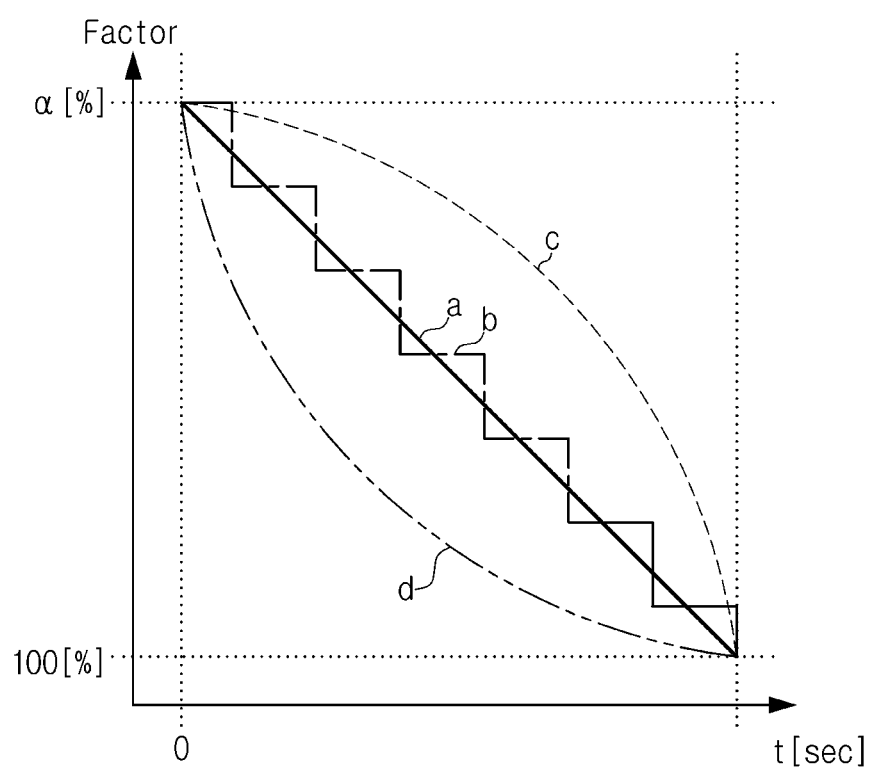
FIG. 4 is a graph showing a change in a control value over time during traction control according to an embodiment of the present disclosure.

However, as described in FIG. 4, an aspect of a graph in which the gain value decreases over time is that the gain value may decrease linearly, as shown in graph (a), the gain value may decrease stepwise, as shown in graph (b), the gain value may decrease along an upward convex line, as shown in graph (c), and the gain value may decrease along a downward convex line, as shown in graph (d). This may be determined according to a factor variation prestored in the main processor 154.

Also, when the road surface changes from a high-friction road surface to a low-friction road surface, the main processor 154 should quickly calculate an amount of engine torque for the changed road surface so that wheel spin can be maintained at an appropriate level. That is, in order to remove errors, the main processor 154 may also perform integral control (I control).

In particular, $K_I$, which is used during I control, refers to a gain value or a gain, and Final $K_I$ is calculated by multiplying Reference $K_I$ by a factor corresponding to the change of the road surface. In detail, Final $K_I$ to be calculated by the main processor 154 may be described using the following Equation 2:

$$\text{Final } K_I = \text{Reference } K_I * I_{factor} \qquad \text{<Equation 2>}$$

where Final $K_I$ indicates a final gain value to be applied during I control, Reference $K_I$ indicates a reference gain value during I control, and $I_{factor}$ will be described in detail with reference to FIG. 4.

That is, the maximum value is assigned to $I_{factor}$ so that the maximum value can be assigned to the gain value at the time at which the road surface changes (0 sec). As time passes, 100% is assigned to $I_{factor}$ at a final time by decreasing the gain value. Accordingly, a reference value I may be calculated as a final I control value.

Accordingly, the main processor 154 may set a final amount of engine torque on the basis of the Final $K_P$ and Final $K_I$ calculated through Equation 1 and Equation 2.

However, although the main processor 154 determines that the vehicle 1 is traveling on a low-friction road surface into which a high-friction road surface changed, spin of the driven wheel may be smaller than a predetermined first spin threshold or acceleration of the vehicle 1 may be smaller than zero. In this case, the step of calculating the P control value and the I control value according to an embodiment of the present disclosure may not be performed.

Next, the memory 155 stores programs and data of the traction control system 150.

In detail, the memory 155 may include a non-volatile memory such as a flash memory, a read-only memory (ROM), an erasable programmable ROM (EPROM), and an electrically erasable programmable ROM (EEPROM), as well as a volatile memory such as a static random access memory (SRAM) and a dynamic RAM (DRAM).

The non-volatile memory may semi-permanently store a control program and control data for controlling operation of the traction control system 150, and the volatile memory may load the control program and control data from the non-volatile memory, temporarily store the control program and the control data, and temporarily store various control signals output by the main processor 154.

The elements of the traction control system 150 according to an embodiment of the present disclosure have been described above.

Figure 5:
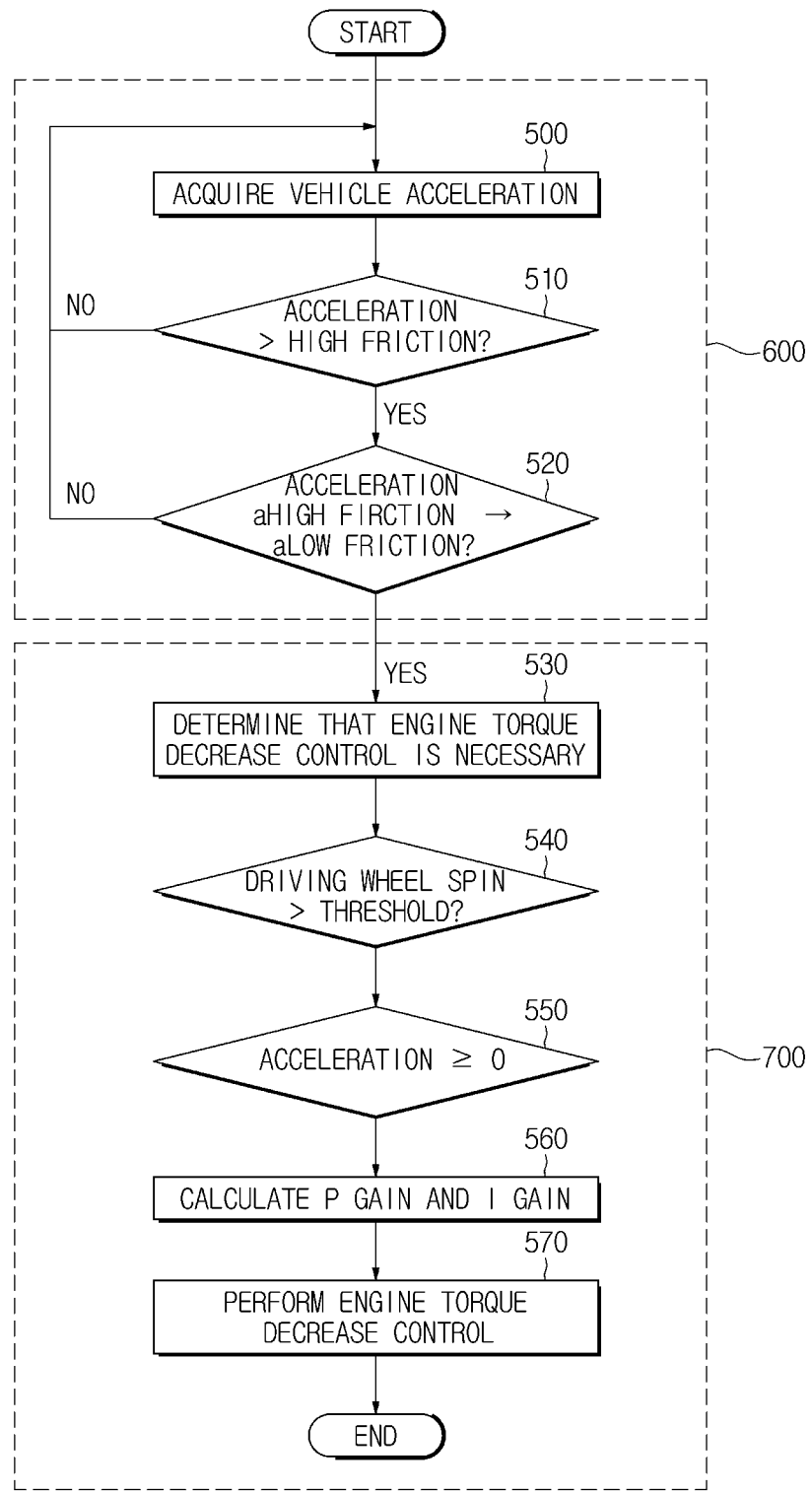
FIG. 5 is a flowchart illustrating a control method of a traction control system according to an embodiment of the present disclosure.
Figure 6:
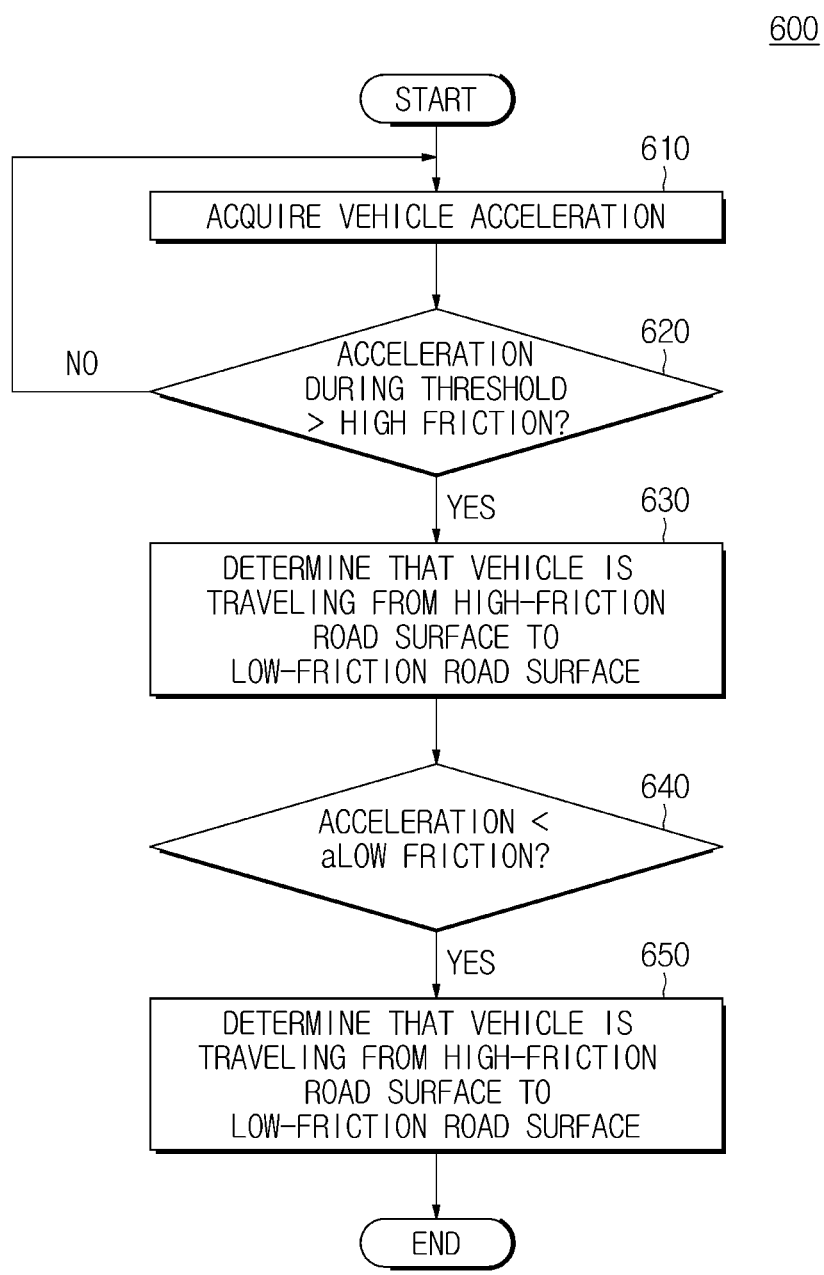
FIG. 6 is a flowchart illustrating a portion of the control method of a traction control system according to an embodiment of the present disclosure.
Figure 7:
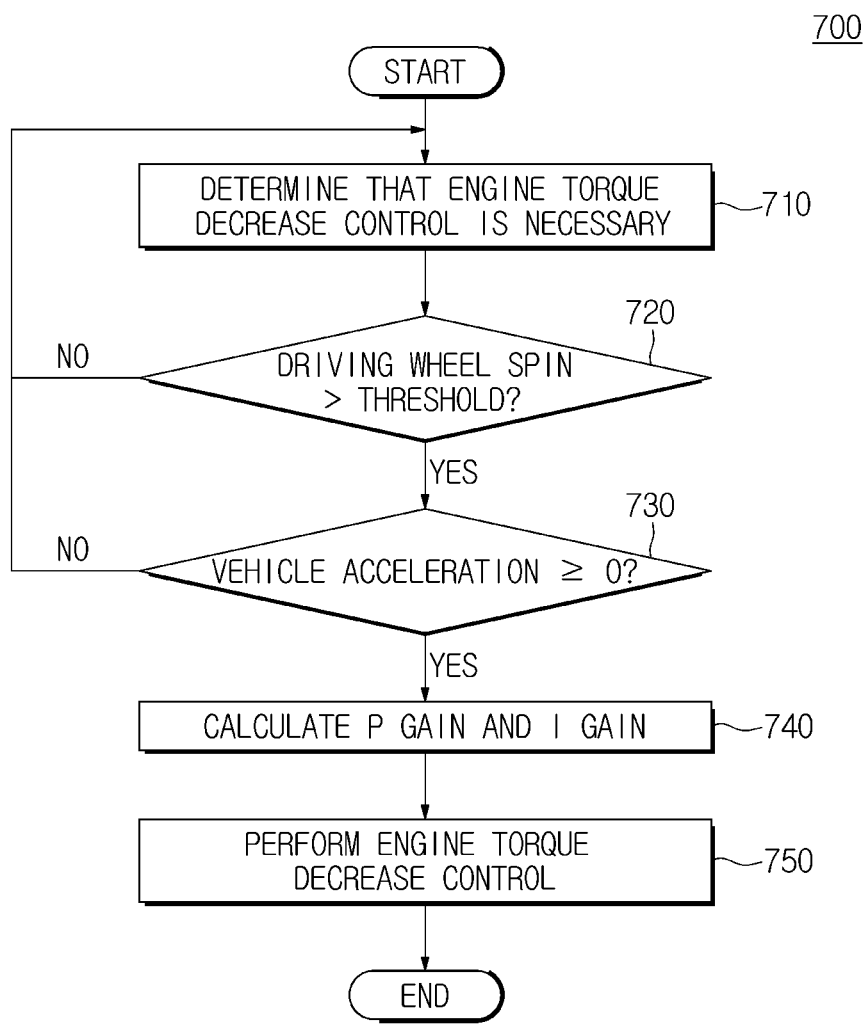
FIG. 7 is a flowchart illustrating a portion of the control method of a traction control system according to another embodiment of the present disclosure.

FIGS. 5 to 7 are flowcharts showing a control method of a traction control system 150 according to an embodiment of the present disclosure.

In detail, FIGS. 5 to 7 are flowcharts showing the control method of the traction control system 150. FIG. 5 shows the entire flowchart. FIG. 6 is a flowchart illustrating a method 600 by which the traction control system 150 determines whether engine torque decrease control is required according to a determination of a road surface condition. FIG. 7 is a flowchart illustrating a method 700 by which the traction control system 150 determines an amount by which engine torque is decreased.

First, as shown in FIG. 5, the traction control system 150 according to an embodiment of the present disclosure acquires acceleration of a vehicle 1 (500). In detail, a main processor 154 may calculate acceleration through a speed of each wheel detected by a speed sensor 199, or may receive acceleration of the vehicle 1 measured by an acceleration sensor 196 through a communicator 151.

Also, the main processor 154 compares the acquired acceleration value with a high-friction value, which is an acceleration threshold for determining whether friction is high. In this case, when the acquired acceleration value is maintained at a level higher than the high-friction value for a certain time period (yes in 510), the main processor 154 determines that the vehicle 1 is traveling on a high-friction road surface.

Next, when the acceleration value changes from the high-friction value to a low-friction value (yes in 520) after the acquired acceleration value is maintained at the level higher than the high-friction value for the certain time period (yes in 510), the main processor 154 determines that the vehicle 1 is traveling from the high-friction road surface to a low-friction road surface.

Subsequently, when a driven wheel spin is greater than a predetermined threshold value (yes in 540) and acceleration of the vehicle 1 is greater than or equal to zero (yes in 550) after it is determined that the vehicle 1 is traveling on the road that changes from the high-friction road surface to the low-friction road surface (530), the traction control system 150 calculates P Gain and I Gain to determine an amount of engine torque according to an embodiment of the present disclosure (560).

In this case, the P Gain and the I Gain indicate Final $K_P$ for P control calculated through Equation 1 and Final $K_I$ for I control calculated through Equation 2, respectively, when the PI control method is used to calculate the amount by which the engine torque is decreased.

In this case, Final P Gain and Final I Gain may be calculated by assigning the maximum gain values to $K_P$ and $K_I$ during a change of the road surface and then multiplying $K_P$ and $K_I$ by a factor for decreasing the gain values over time.

Accordingly, the main processor 154 may perform engine torque decrease control by means of P Gain and I Gain (570), and thus quickly minimize the occurrence of driven wheel spin of the vehicle 1.

In detail, FIG. 6 is a detailed flowchart showing a case in which the vehicle is traveling on a low-friction road surface into which a high-friction road surface changed in the control method of the traction control system shown in FIG. 5.

First, the traction control system 150 according to an embodiment of the present disclosure acquires an acceleration value of the vehicle 1 (610). In this case, when the acquired acceleration value is maintained at a level higher than a high-friction value for a certain time period (yes in 620), the traction control system 150 determines that the vehicle 1 is traveling on a high-friction road surface (630).

Subsequently, when the acquired acceleration value becomes smaller than a predetermined low-friction value (yes in 640), the traction control system 150 determines that the vehicle travels from the high-friction road surface to a low-friction road surface (650).

Also, in detail, FIG. 7 is a flowchart showing a torque control method when it is determined that the vehicle is traveling on a low-friction road surface into which a high-friction road surface changed in the control method of the traction control system of FIG. 5.

That is, when it is determined that the vehicle 1 is traveling on a low-friction road surface into which a high-friction road surface changed, the main processor 154 determines that engine torque decrease control is necessary to minimize wheel spin of a driven wheel (710).

When a driven wheel spin is greater than a predetermined threshold value (yes in 720) and acceleration of the vehicle 1 is greater than or equal to zero (yes in 730) after it is determined that the vehicle 1 is traveling on the road that changes from the high-friction road surface to the low-friction road surface (710), the traction control system 150 calculates P Gain and I Gain to determine the amount of engine torque according to an embodiment of the present disclosure (740).

However, when the driving wheel spin is smaller than the predetermined threshold value (no in 720) and the acceleration of the vehicle 1 is less than zero (no in 730) after it is determined that the vehicle 1 is traveling on the road that changes from the high-friction road surface to the low-friction road surface (710), the possibility of spin occurring in the driving wheel of the vehicle 1 is low. Accordingly, the traction control system 150 determines whether torque control corresponding to a decrease in engine torque is necessary instead of calculating P Gain and I Gain to determine the amount of engine torque according to an embodiment of the present disclosure.

In this case, P Gain and I Gain indicate Final $K_P$ for P control calculated through Equation 1 and Final $K_P$ for I control calculated through Equation 2, respectively, when the PI control method is used to calculate the amount by which engine torque is decreased.

In this case, Final P Gain and Final I Gain may be calculated by assigning the maximum gain values to $K_P$ and $K_I$ during a change of the road surface and then multiplying $K_P$ and $K_I$ by a factor for decreasing the gain values over time.

Accordingly, the main processor 154 may perform engine torque decrease control by means of P Gain and I Gain, thus quickly minimizing the occurrence of driven wheel spin of the vehicle 1.

As is apparent from the above description, it is possible to minimize vehicle spin that may occur when a vehicle is traveling from a high-friction (High-p) road surface to a low-friction (Low-p) road surface during TCS engine control.

While an embodiment of the present disclosure has been particularly shown and described, it should be understood by those skilled in the art that various changes in form and details may be made therein without departing from the spirit and scope of the disclosure as defined by the appended claims, and the various changes are not to be understood as departing from the spirit and scope of the present disclosure.

What is claimed is:

1. A traction control system for controlling engine torque at a time of occurrence of wheel spin, the traction control system comprising:
a controller configured to
receive acceleration of a vehicle, and
when a vehicle acceleration exceeds a first acceleration threshold and then the vehicle acceleration decreases to a level lower than a second acceleration threshold smaller than the first acceleration threshold, output a second engine torque smaller than a first engine torque corresponding to the decreased vehicle acceleration, and then increase the second engine torque to the first engine torque during a predetermined first threshold time.

2. The traction control system of claim 1, wherein when the vehicle acceleration is maintained at a level higher than the first acceleration threshold for a predetermined time period, the controller determines that the vehicle is traveling on a high-friction road surface, and when the vehicle acceleration decreases to a level lower than the second acceleration threshold smaller than the first acceleration threshold, the controller determines that the vehicle is traveling on a low-friction road surface into which the high-friction road surface changed.

3. The traction control system of claim 2, wherein the second engine torque is calculated with a maximum gain.

4. A traction control system for controlling engine torque at a time of occurrence of wheel spin, the traction control system comprising:
   a controller configured to
   receive acceleration of a vehicle,
   determine whether a road changes from a high-friction surface road to a low-friction surface road on the basis of a change in the received acceleration of the vehicle,
   determine whether a spin of driven wheels is greater than a predetermined spin threshold when the road changes from the high-friction surface road to the low-friction surface road, and
   perform engine torque decrease control to decrease an engine torque when the spin of the driven wheels is greater than the predetermined spin threshold.

5. The traction control system of claim 4, wherein the controller determines that the road changes from the high-friction surface road to the low-friction surface road when the received acceleration of the vehicle changes from a first threshold acceleration corresponding to the high-friction road surface to a second threshold acceleration corresponding to the low-friction road surface.

6. The traction control system of claim 4, wherein the controller calculates a proportional gain (P gain) and an integral gain (I gain) of a proportional-integral (PI) control used to calculate an amount by which the engine torque is decreased when the spin of the driven wheels is larger than the predetermined spin threshold, and applies the calculated P gain and I gain to perform the engine torque decrease control.

7. The traction control system of claim 6, wherein the controller calculates the P gain and the I gain according to the following Equation 1 and the following Equation 2, respectively:

$$\text{Final } K_P = \text{Reference } K_P * P_{factor} \quad \text{<Equation 1>}$$

$$\text{Final } K_I = \text{Reference } K_I * I_{factor} \quad \text{<Equation 2>}$$

where Final $K_P$ indicates a final gain value to be applied during a P control, Reference $K_P$ indicates a reference gain value during the P control, $P_{factor}$ indicates a calibration parameter during the P control, Final $K_I$ indicates a final gain value to be applied during an I control, Reference $K_I$ indicates a reference gain value during the I control, and $I_{factor}$ indicates a calibration parameter during the I control.

8. The traction control system of claim 7, wherein a maximum value is assigned to the $P_{factor}$ so that the maximum value is assigned to a gain value when the road changes from the high-friction surface road to the low-friction surface road, and as time passes, 100% is assigned to the $P_{factor}$ at a final time by decreasing the gain value.

9. The traction control system of claim 7, wherein a maximum value is assigned to the $I_{factor}$ so that the maximum value is assigned to a gain value when the road changes from the high-friction surface road to the low-friction surface road, and as time passes, 100% is assigned to the $I_{factor}$ at a final time by decreasing the gain value.

10. A traction control method for controlling engine torque at a time of occurrence of wheel spin, the traction control method comprising:
    receiving acceleration of a vehicle;
    determining whether a road changes from a high-friction road surface to a low-friction road surface on the basis of a change in the received vehicle acceleration;
    determining whether spin of driven wheels is greater than a predetermined spin threshold when the road changes from the high-friction road surface to the low-friction road surface; and
    performing engine torque decrease control to decrease the engine torque when the spin of the driven wheels is greater than the predetermined spin threshold.

11. The traction control method of claim 10, the engine torque decrease control includes calculating a proportional gain (P gain) and an integral gain (I gain) of a proportional-integral (PI) control used to calculate an amount by which the engine torque is decreased when the spin of the driven wheels is larger than the predetermined spin threshold, and applying the calculated P gain and I gain to perform the engine torque decrease control.

* * * * *